United States Patent
Belluomini et al.

(10) Patent No.: US 7,873,878 B2
(45) Date of Patent: Jan. 18, 2011

(54) DATA INTEGRITY VALIDATION IN STORAGE SYSTEMS

(75) Inventors: Wendy Belluomini, San Jose, CA (US); John Edward Bish, Tucson, AZ (US); Kenneth Day, III, Tucson, AZ (US); James Hafner, San Jose, CA (US); Bret S. Weber, Wichita, KS (US)

(73) Assignee: International Business Machines Corporation, Armonk, NY (US)

(*) Notice: Subject to any disclaimer, the term of this patent is extended or adjusted under 35 U.S.C. 154(b) by 387 days.

(21) Appl. No.: 11/860,461

(22) Filed: Sep. 24, 2007

(65) Prior Publication Data

US 2009/0083504 A1 Mar. 26, 2009

(51) Int. Cl.
 *G06F 11/00* (2006.01)
(52) U.S. Cl. .................. 714/52; 714/6; 714/15
(58) Field of Classification Search .......... 714/6, 714/15, 52
 See application file for complete search history.

(56) References Cited

U.S. PATENT DOCUMENTS

| | | | |
|---|---|---|---|
| 4,761,785 A | 8/1988 | Clark et al. | |
| 5,233,618 A * | 8/1993 | Glider et al. | 714/6 |
| 5,469,453 A * | 11/1995 | Glider et al. | 714/6 |
| 5,644,766 A | 7/1997 | Coy et al. | |
| 6,195,761 B1 * | 2/2001 | Kedem | 714/6 |
| 6,209,090 B1 * | 3/2001 | Aisenberg et al. | 713/178 |
| 6,480,970 B1 * | 11/2002 | DeKoning et al. | 714/6 |
| 6,658,592 B1 | 12/2003 | Cohen et al. | |
| 6,718,436 B2 | 4/2004 | Kim et al. | |
| 6,804,674 B2 | 10/2004 | Hsiao et al. | |
| 6,952,797 B1 * | 10/2005 | Kahn et al. | 714/770 |
| 7,051,155 B2 | 5/2006 | Talagala et al. | |
| 7,188,230 B2 * | 3/2007 | Osaki | 711/216 |
| 7,360,113 B2 * | 4/2008 | Anderson et al. | 714/5 |
| 7,640,390 B2 * | 12/2009 | Iwamura et al. | 711/103 |
| 2002/0196685 A1 * | 12/2002 | Topham | 365/200 |
| 2003/0023933 A1 | 1/2003 | Duncan | |
| 2003/0145167 A1 * | 7/2003 | Tomita | 711/114 |
| 2004/0024963 A1 | 2/2004 | Talagala et al. | |
| 2004/0123032 A1 | 6/2004 | Talagala et al. | |
| 2004/0268178 A1 * | 12/2004 | Fredin | 714/6 |
| 2005/0005191 A1 | 1/2005 | Judd et al. | |
| 2005/0076260 A1 * | 4/2005 | Hung | 714/6 |
| 2006/0109792 A1 | 5/2006 | Broadbent et al. | |
| 2006/0179381 A1 | 8/2006 | Durica et al. | |
| 2006/0248378 A1 | 11/2006 | Greanac et al. | |
| 2007/0101182 A1 * | 5/2007 | Takahashi et al. | 714/5 |

(Continued)

*Primary Examiner*—Robert Beausoliel
*Assistant Examiner*—Joshua P Lottich
(74) *Attorney, Agent, or Firm*—Century IP Group; F. Jason Far-hadian, Esq.

(57) ABSTRACT

A data storage method comprises storing first data in at least a first data chunk, wherein the first data chunk is a logical representation of one or more sectors on at least a first disk drive in a storage system; storing first metadata, associated with the first data, in at least a first appendix, wherein the first appendix is a logical representation of a sector region on at least the first disk drive in the storage system, and wherein the first metadata comprises first atomicity metadata (AMD) and first validity metadata (VMD) associated with the first data; and storing a copy of the first VMD for the first data in at least one low latency non-volatile storage (LLNVS) device.

20 Claims, 8 Drawing Sheets

U.S. PATENT DOCUMENTS

2007/0162523 A1* 7/2007 Lin .......................... 707/204
2007/0179993 A1* 8/2007 Arruza ...................... 707/202
2008/0282105 A1* 11/2008 Deenadhayalan et al. ...... 714/6
2009/0150599 A1* 6/2009 Bennett ..................... 711/103

* cited by examiner

US 7,873,878 B2

DATA INTEGRITY VALIDATION IN STORAGE SYSTEMS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention exclusively to material associated with such marks.

FIELD OF INVENTION

The present invention relates generally to checking the integrity of data in disk storage systems and, more particularly, to a system and method for determining possible undetected disk errors that may compromise the integrity of data stored in a disk storage system.

BACKGROUND

Disk drives are designed to store and retrieve data. With increasing capacities and higher densities, disk drives are becoming less reliable in performing these functions.

Three disk behaviors contribute to corruption of data stored on a disk drive. During a write, the disk arm and head must align with very accurate precision on the track that comprises the physical block in order to deposit the new "bits" of write data. In the case of a write, two tracking errors can occur. Either the head can be misaligned so badly that the data is written to a completely unintended track or the head may be misaligned so that the data falls in a gap between two adjacent tracks.

In the former case, called a Far Off-track Write, two physical blocks are placed in error because the target block is not overwritten and so comprises stale data and the overwritten block has lost the data that should be there. In the latter case, called a Near Off-track Write, one block is placed in error because the target block is not overwritten.

A second type of error that also occurs during a write happens when the bits are not changed on the disk, for example, if the preamp signal is too weak to change the magnetic setting of the bits on the platter. In this case, the data remaining on the platter is stale (i.e., the data is not up-to-date with the write commands issued to the drive). These errors are called dropped writes because the bits are not recorded on the platter.

Both of the above-mentioned types of write errors are called "Undetected Write Errors" because the disk drops the write data in the wrong location and does not itself detect the problem. In the literature, the terms "dropped write" or "phantom write" are sometimes used to describe some or all of these situations.

A third type of error is a misaligned head placement when reading data. In this case, the disk may read the data bits from a completely unintended track (i.e., Far Off-track Read) or from a gap between two tracks (i.e., Near Off-track Read) and return incorrect data to the user or application. Both of these errors are typically transient and are corrected when a subsequent read occurs to the same track. In addition, if the read tracks correctly but on the unintended target of a Far Off-track Write, incorrect data will be returned to the user or application.

In all the above scenarios, the drive typically does not detect a problem and returns a successful status notice to the user, host or application. Other error scenarios may also occur where the disk returns a success status while the user or application gets incorrect data. Such write or read errors can be referred to as Undetected Disk Error (UDE). Because a disk drive cannot independently detect UDEs, other methods need to be provided to detect such errors. Two main solution classes are available in the related art for verifying the accuracy of data read or written to disk drives.

The first class is the file system or the application layer. For example, some file systems and many database systems use checksums on data chunks (e.g., 4 KB chunks) which are stored separate from the data chunks themselves. The checksums are read along with the data chunks; new checksums are recomputed from the read data chunks and are compared with the checksums read along with the data chunks. If the new checksum matches the old ones, then the read data chunk is assumed to be correct.

The above method has two fundamental limitations. First, said method typically cannot recover from detected errors, unless they are also integrated with some additional data redundancy such as redundant array of independent disk drives (RAID). Second, said method is not always the source for every disk read, and so checking may not occur as often as necessary.

For example, when the source of a disk read is not the file system or application layer, an underlying (and logically separate) layer in a RAID architecture may perform reads in the context of an application write (e.g., in a read-modify-write scenario). The application layer does not validate these types of reads. In such a case, the read may extract incorrect data from the disk and then use this incorrect data to update the RAID redundancy data. Thus, an error that goes undetected by the application may propagate errors in the underlying RAID layer, compounding the problem created by the drive.

RAID is a disk subsystem that is used to increase performance and/or provide fault tolerance. RAID architecture comprises a plurality of disk drives and a disk controller (also known as an array controller). RAID improves performance by disk striping, which interleaves bytes or groups of bytes across multiple drives, so more than one disk is reading and writing simultaneously. Fault tolerance is also achieved in a RAID architecture by way of implementing mirroring or parity.

U.S. Pat. No. 7,020,805, "Efficient Mechanisms for Detecting Phantom Write Errors", US Patent Application 2006/0200497, "Detection and Recovery of Dropped Writes in Storage Devices", and published paper "A Client-based Transaction System to Maintain Data Integrity", by William Paxton, in Proceedings of the seventh ACM symposium on Operating systems principles, 1979, pp 18-23 provide examples of such systems.

A second class of methods to detect UDEs are implemented in the storage system itself, at a layer that is closer to the hardware layer so that every disk read and write that occurs in the system is monitored, whether the read or write is generated by the application layers or by the storage system layer itself. This class, however, cannot detect errors that occur in system layers that are higher than the storage system (e.g., in the network or internal host busses). It is desirable to have a method that not only detects a problem but also is capable of also locating where the error occurs and further, to correct the errors if possible.

There are a number of subclasses of methods that can be used within the storage system for detection of possible location and correction of UDEs. The first is based on parity scrubbing. RAID systems that protect against disk failures (such as RAID1 or RAID5) may use a method called "parity scrub" to detect these sorts of errors. For example, in a RAID5 system, the process involves reading the data and the respective redundancy data (i.e., parity data), recomputing the parity value and comparing the computed parity value with the parity value read from disk.

If the two parity values do not match, then an error has occurred. Unfortunately, RAID5 does not provide a means to locate or correct an error detected in the above manner. More importantly, these parity scrubs may not detect errors that have been masked by other operations that were applied to data between the occurrence of a UDE and the parity scrub operation.

For example, a UDE may occur during a write to a first disk in a RAID5 array that comprises four data disks and one parity disk. Subsequently, a write may be issued to the array for the second, third and fourth disks. Typically, an array will promote this operation to a full write by reading the data from the first disk, computing parity and writing out the new data to second, third and fourth disks and to the parity disk. After this operation, the data on the first disk is still incorrect, but the parity is now consistent with all the data (i.e., the parity now comprises the bad data on the first disk). As a result, a subsequent parity scrub will not detect the bad data.

Another example of error propagation occurs when subsequent to a UDE, a successful and correct write (e.g., using a read-modify-write methodology) occurs to the same location. Such operation will leave the parity corrupted with the effects of the bad data. In effect, the bad data moves from the disk with the UDE to the parity disk. Such migration effects can occur whenever the bad data is read from the disk in order to perform any write operation to the stripe.

Similar and even more complicated scenarios occur even with higher fault tolerant RAID algorithms such as RAID6. RAID6 is a fault tolerant data storage architecture that can recover from the loss of two storage devices. It achieves this by storing two independent redundancy values for the same set of data. In contrast, RAID5 only stores one redundancy value, the parity.

A parity scrub on a RAID6 array can detect, locate and correct a UDE (assuming no disks have actually failed) but only if no operations were performed on the stripe that may have migrated or hidden the UDE. Parity scrubs are very expensive operations and are typically done sparingly. Consequently, the conditional assumption that no operations that migrated or failed to detect UDEs have occurred before the scrub rarely holds in practice.

A location algorithm in the context of RAID6 (or higher fault tolerance) is disclosed in US Patent Application 2006/0248378, "Lost Writes Detection in a Redundancy Group Based on RAID with Multiple Parity." This location algorithm must be used in conjunction with parity scrubs as an initial detection method. RAID parity scrub methods are incapable of reliably detecting and/or locating and correcting UDEs in an array.

A second subclass of methods for addressing the problem of UDEs within the storage system is based on the write cache within the system. The method described in US Patent Application 2006/0179381, "Detection and Recovery of Dropped Writes in Storage Devices" uses the cache as a holding place for data written to disk. Only after the data is re-read from the disk and verified is the data cleared from the cache. This is an expensive method due to a number of factors.

First, the discussed method requires using valuable cache space that could be used to improve read/write cache performance of the system. Second, it requires a separate read call (at some unspecified time) in order to validate the data on the disk. If that read occurs immediately after the data is written, Off-track Write Errors may not be detected because the head tracking system may not have moved.

If the read occurs when the system needs to clear the cache (e.g., to gain more cache space for another operation), then a pending operation will be delayed until the read and compare occurs. Alternatively, the read could happen at intermediate times, but it will impact system performance with the extra IOs.

A third subclass uses some form of metadata to manage the correctness of the data. The metadata is stored in memory and possibly on separate disks or arrays from the arrays the metadata represents. For example, US Patent Application 2005/0005191 A1, "System and Method for Detecting Write Errors in a Storage Device," discloses a method for UDE detection. A checksum and sequence number for each block in a set of consecutive data blocks is stored in an additional data block appended immediately after. A second copy is stored in memory for the entire collection of blocks on the disk and this copy is periodically flushed to disk (which necessarily is a different disk) and preferably is stored on two disks for fault tolerance.

A related scheme is found in U.S. Pat. No. 6,934,904, "Data Integrity Error Handling in a Redundant Storage Array" where only checksums are used, but no particular rule is defined for the storage of the primary checksum. US Patent Application 2003/0145279, "Method for using CRC as Metadata to Protect Against Drive Anomaly Errors in a Storage Array" discloses a similar checksum algorithm for detection together with a location algorithm.

The above schemes suffer from the problems of high disk overhead and the additional IOs required to manage and preserve the checksum/sequence number data. Other examples of the third subclass are disclosed in U.S. Pat. No. 7,051,155, "Method and System for Striping Data to Accommodate Integrity Metadata."

The fourth subclass of storage based UDE detectors is similar to the third subclass in that the fourth subclass also uses some form of metadata to verify correctness of data read from disk. However, in the fourth subclass, the metadata is kept within the array and is collocated with the data or the parity in the array. For example, U.S. Pat. No. 7,051,155, "Method and System for Striping Data to Accommodate Integrity Metadata" discloses an embodiment where one copy of the stripe metadata is stored within the stripe.

The above scheme provides a significant performance advantage when the system performs a read-modify-write to update data in the stripe. The method described in US Patent Application US2004/0123032, "Method for Storing Integrity Metadata in Redundant Data Layouts" uses extra sectors adjacent to the sectors of the parity strip(s) to store the metadata for the data chunks in the stripe. This method includes use of a generation number on the metadata, stored in NVRAM in order to verify the contents of the metadata.

Other examples of the fourth subclass include the methods applicable to RAID5 arrays that are described in U.S. Pat. No. 4,761,785, "Parity Spreading to Enhance Storage Access;" US Patent Application 2006/0109792 A1, "Apparatus and Method to Check Data Integrity When Handling Data;" and U.S. Pat. No. 7,051,155, "Method and System for Striping Data to Accommodate Integrity Metadata."

In some disk storage systems, metadata is stored in non-volatile read access memory (NVRAM) or on rotating disks.

The former has significant cost and board layout issues to accommodate the total volume of metadata that must be stored and managed, as well as the means to maintain the memory in non-volatile state. Furthermore, such memory takes a lot of motherboard real estate and this can be problematic.

Particularly, in fault tolerant storage systems, with at least two coordinated controllers, the NVRAM must be shared between the two controllers in a reliable manner. This introduces complex shared memory protocols that are difficult to implement and/or have performance penalties. Rotating disks, on the other hand, have significant performance penalties and reliability issues. That is, a rotating disk has very low latency compared to memory, so accessing (e.g., reading or writing) the metadata can have a significant performance impact on the overall system.

Additionally, rotating disks have a fairly low reliability record compared to memory. Consequently, vital metadata need to be stored at least as reliably as the data it represents. For example, when data is stored in a RAID6 array, wherein two disk losses may be tolerated, the metadata should also be stored in a manner that can survive two disk losses as well.

Unfortunately, the above requirements impose significant additional costs and performance impacts, because the above-mentioned classes and subclasses for detecting and correcting UDEs are either inefficient or ineffective in uncovering sufficient details about a read or write error to help locate and fix a problem in many circumstances. Thus, data recovery methods and systems are needed that can overcome the aforementioned shortcomings.

SUMMARY

The present disclosure is directed to a system and corresponding methods that facilitate checking for data integrity in disk storage systems.

For the purpose of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a data storage method is provided. The data storage method comprises storing first data in at least a first data chunk, wherein the first data chunk is a logical representation of one or more sectors on at least a first disk drive in a storage system; storing first metadata, associated with the first data, in at least a first appendix, wherein the first appendix is a logical representation of a sector or a portion of a sector on at least the first disk drive in the storage system, and wherein the first metadata comprises first atomicity metadata (AMD) and first validity metadata (VMD) associated with the first data; and storing a copy of the first VMD for the first data in at least one low latency non-volatile storage (LLNVS) device, so that when an error associated with content in the first chunk or the first appendix is detected, the copy of first VMD stored in the LLNVS device can be accessed with a low level of latency for the purpose of comparison with the first VMD stored in the first appendix.

In accordance with another embodiment, a data storage system is provided. The data storage system comprises at least a first disk drive for storing first data in at least a first data chunk, wherein the first data chunk is a logical representation of one or more sectors on at least the first disk drive in a storage system; a first appendix for storing first metadata, associated with the first data, wherein the first appendix is a logical representation of a sector or a portion of a sector on at least the first disk drive in the storage system, and wherein the first metadata comprises first atomicity metadata (AMD) and first validity metadata (VMD) associated with the first data; and at least one low latency non-volatile storage (LLNVS) device for storing a copy of the first VMD for the first data, so that when an error associated with content in the first chunk or the first appendix is detected, the copy of first VMD stored in the LLNVS device can be accessed with a low level of latency for the purpose of comparison with the first VMD stored in the first appendix.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one or more embodiments, systems and methods for detecting, locating or correcting UDEs are provided. By way of example, certain embodiments are disclosed herein as applicable to a RAID architecture. It should be noted, however, that such exemplary embodiments should not be construed as limiting the scope of the invention to a RAID system. The principals and advantages disclosed herein may be equally applicable to other data storage environments.

In accordance with one embodiment, a method for detecting a UDE is provided when data is read or written to one or more disk drives. To be able to quickly determine occurrence of a UDE, for example during a write operation, data is written to a disk in conjunction with parity information, validity metadata (VMD) and atomicity metadata (AMD). VMD provides information such as sequence numbers associated with the target data to determine if the data written was corrupted. AMD provides information on whether the target data and the corresponding VMD were successfully written during an update phase. Preferably, VMD is smaller in volume in comparison with AMD.

In one embodiment, the VMD for each disk and preferably mirror copies of it are written to one or more low-latency non-volatile storage (LLNVS) devices (e.g., flash drives). The small size of the VMD and the quick accessibility of the LLNVS devices in combination allow a controller unit in the storage system to quickly detect a UDE as provided in more detail below. In one embodiment, a RISK architecture may be implemented within the context of the above-noted storage system to allow for further pinpointing of detected errors.

Figure 1:
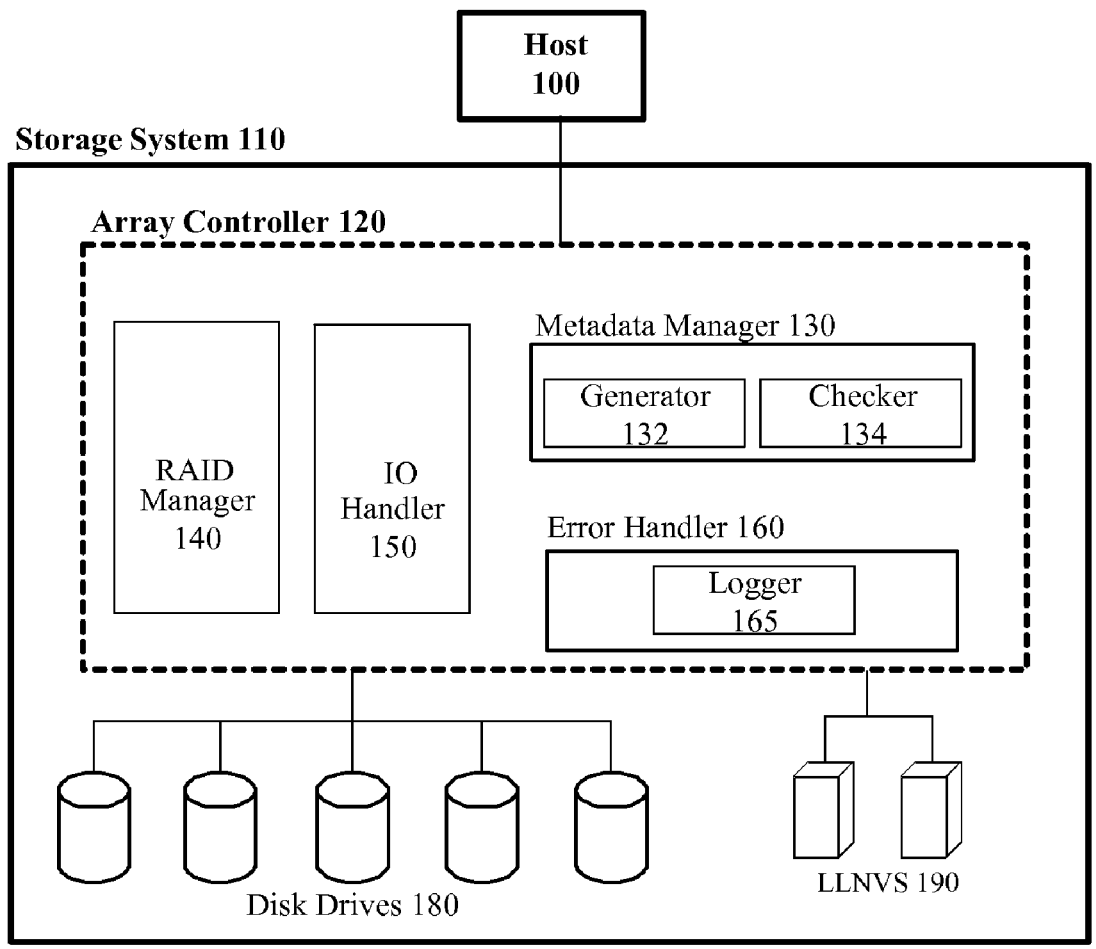
FIG. 1 is an exemplary block diagram of a data storage environment and its components, in accordance with one or more embodiments.

Referring to FIG. 1, an exemplary data storage environment in accordance with one or more embodiments is provided. The data storage environment comprises a storage system 110 connected to a host (e.g., computing system) 100. Host 100 communicates with storage system 110 to read or write data to disk drives 180. In one embodiment, an array controller (i.e., disk controller) 120 is provided to manage and service read and write requests submitted by host 100 to storage system 110 and to also provide error detection and data recovery services.

Array controller 120 may comprise a RAID manager 140, IO handler 150, a metadata manager 130 and an error handle 160. RAID manager 140 is configured to manage the tasks and operations associated with maintaining data on disk drives 180 in a fault tolerant environment. IO handler controls the input and output of data to the array controller 120 according to instructions provided by RAID manager 140.

Metadata manager 130 comprises a generator 132 and checker 134. Generator 132 is configured to generate metadata that is to be stored in data appendices, parity appendices, etc. Such metadata in one or more embodiments comprise AMD and VMD associated with data chunks stored on disk drives 180. Checker 134 is configured to verify accuracy of metadata stored on disk drives 180 in response to an IO request.

As noted earlier, VMD and AMD may be employed in one or more embodiments to help detect the validity of data being read or written to one or more disk drives 180. In one embodiment, multiple sectors of data may be organized into data chunks. A metadata sector, or portion thereof, may be collocated with a corresponding data chunk to store both the AMD and the VMD for that data.

In certain embodiments, one or more LLNVS devices 190 are utilized to store one or more additional copies of the VMD to improve performance for access to this type of metadata. Further, a compact size VMD is utilized to reduce the overall cost and storage overhead for this type of metadata. In accordance with an exemplary embodiment, the AMD may comprise one or more cyclic redundancy check (CRC) metadata. This type of metadata may be used in the same way as a checksum to detect accidental alteration of data during transmission or storage.

In one embodiment, the CRC may be computed in the context of a small computer system interface (SCSI) data integrity field, for example. The SCSI standards define commands, protocols, and electrical and optical interfaces that are most commonly used for hard disks and tape drives. Preferably, special hardware in an exemplary embodiment is implemented to meet the SCSI standard to provide an efficient means of computing the CRC.

In some embodiments, an AMD may include one or more longitudinal redundancy checks (LRCs) computed by software or hardware. The LRC may use a parity bit to verify and determine accuracy of data stored or transmitted. As noted earlier, storage system 110 may be implemented utilizing one or more LLNVS devices 190 to hold redundant copies of the VMD so that the metadata is stored as reliably as the data itself (e.g., in a RAID system).

In accordance with one embodiment, a device driver for the disks drives 180 comprises the logic code to monitor and verify the accuracy of data when data is read from or written to the disks drives 180, for any purpose, including for the purposes of writing new data to an underlying RAID layer. As a result, the device driver helps prevent hiding or migration of corrupt data that a parity scrub, for example, may not detect.

In one or more embodiments, the device driver may be implemented independent of the RAID layer, so that a single data integrity implementation layer can be deployed that works for one or more RAID algorithms or filters in the storage system 110. The device driver may communicate with the RAID layer by reporting potential errors (e.g., when either the VMD or AMD is determined to be corrupted). Preferably, the RAID layer can employ methods such as, but not limited to, parity scrub to determine if the error resides in the data or in the metadata. The RAID layer may be able to correct the corrupted data and the results may be communicated to a data integrity layer for metadata repair, if needed and where possible.

Figure 2:
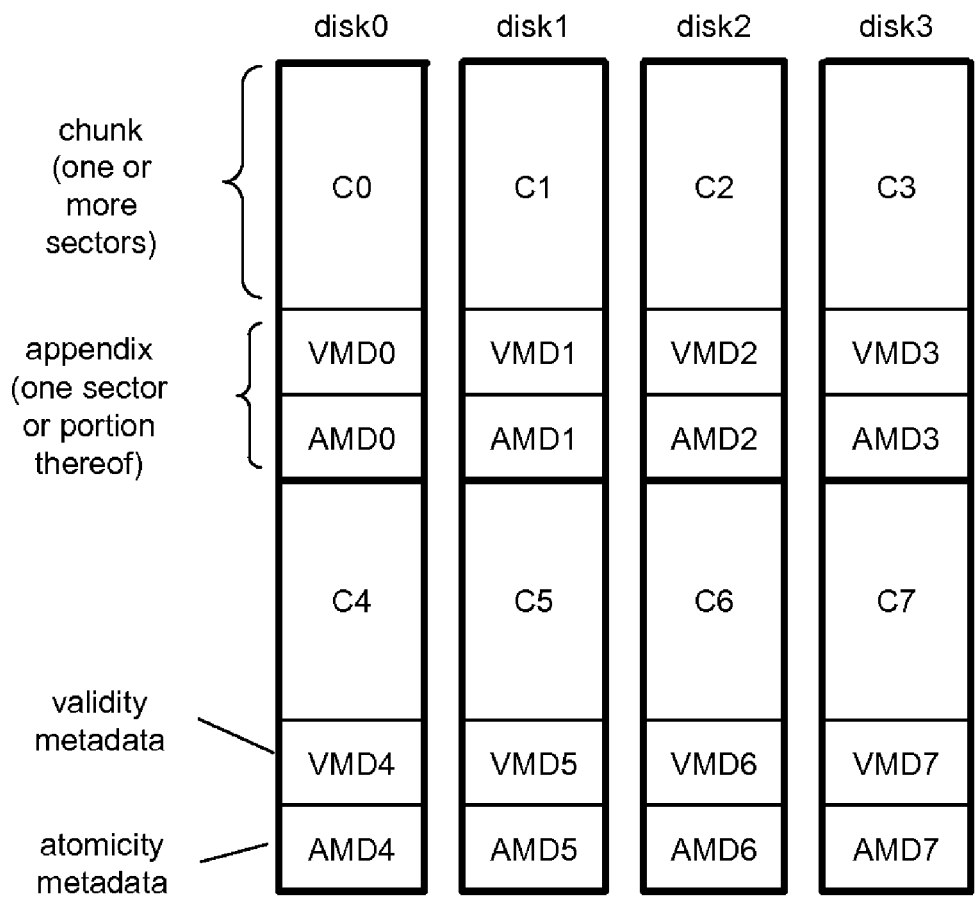
FIGS. 2 and 3 illustrate logical block diagrams of disk drives in a storage system in which data is written to one or more sectors of a disk drive represented as a chunk, and each chunk is associated with an appendix which includes metadata corresponding to the data stored in the chunk, in accordance with one or more embodiments.
Figure 2:
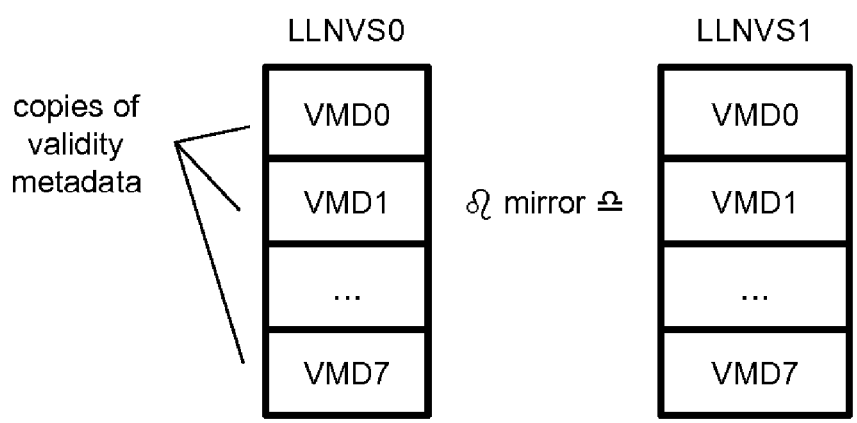
Figure 3:
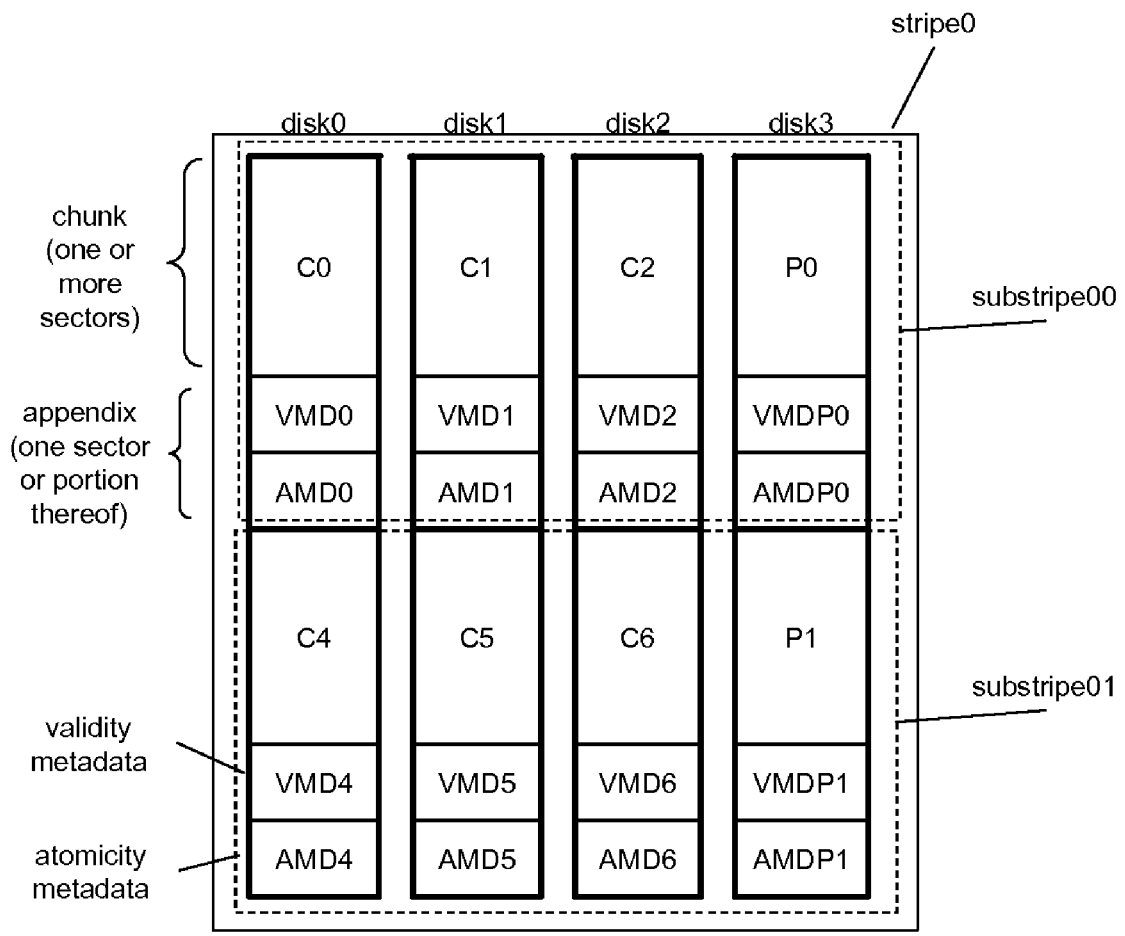
Figure 3:
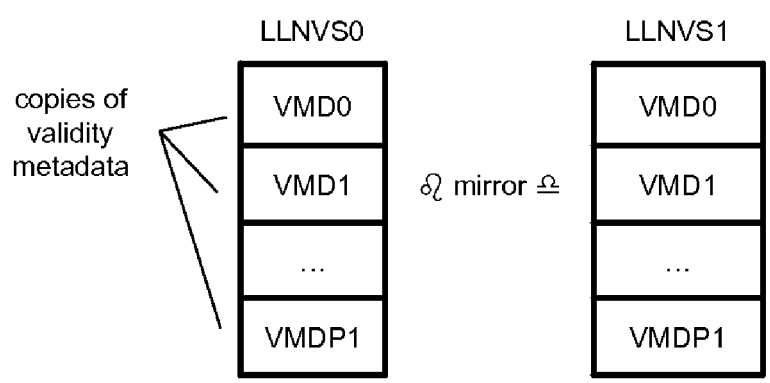

As shown in FIGS. 2 and 3, in some embodiments, data on a disk drive may be divided into metadata chunks, wherein each metadata chunk comprises a data chunk and an appendix, for example. In one embodiment, a data chunk may cover X disk sectors, where X is at least 2. The appendix may cover a sector or perhaps a partial sector (e.g., ½ sector). The appendix may hold a copy of various types of metadata (e.g., AMD, VMD, etc.) for a data chunk.

By way of example, we refer to the above data appendix combination as an X/X+1 scheme, where the X represents the number of data sectors and the "+1" represents the appendix sector, for example. In some embodiments, depending on implementation, the "+1" may represent a partial sector. In certain exemplary embodiments, the value of X may be equal to 8 or 16, for example.

The value assigned to X may depend on a variety of factors. Depending on implementation, the larger the value of X, the more storage efficient is storage system 110. In one embodiment, a larger value for X may result in greater data transfer and bandwidth costs when a data sector and its appendix are both accessed during a read or a write operation.

As noted earlier, in accordance with one embodiment, the appendix may comprise a copy of both types of metadata AMD and VMD. The AMD may comprise some type of checksum of the data in the data chunk. A checksum may be an LRC, or a CRC or a hash value. The AMD may optionally be seeded or included in the calculation a logical or physical block address related to the data chunk. Alternatively, such a block address may be included in the AMD separate from the checksum.

The checksum in the AMD may be computed on X data sectors as a unit or may be the concatenation of checksums of smaller subchunks, such as each sector. In some embodiments, disk drives 180 may have the ability in their DMA engine or in the host or disk interface to compute the SCSI data integrity field (DIF) CRC on one or more data sectors as it moves through the system. This CRC may be for example two bytes and computed from the data for each sector.

In one embodiment, the DIF for each of the X sectors in the data chunk may be concatenated to provide the checksum portion of the AMD for the chunk. Alternatively, disk drives

180 may have the ability in their DMA engine to calculate an LRC (with or without it being seeded by an LBA) as data moves through the memory system. The LRC may be one or more bytes, for example. In exemplary embodiments, the LRC may be 2 or 4 bytes.

In accordance with one embodiment, the concatenation of the LRCs from the X data sectors may be used in the data chunk as the checksum portion of the AMD for the chunk. It is noteworthy that the above-noted implementations are exemplary in nature and any other alternative implementation that meets the objectives for the above-noted features may be also used to accomplish the same, in accordance with one or more alternative embodiments.

In one embodiment, the VMD comprises some type of timestamp or phase marker. Such implementation may be clock-based or associated with a sequence number. The timestamp or phase maker may be changed each time new data is written to the disk. For example, a sequence number can be incremented, if the current sequence number is known, after a read of old data, for example.

If the current value is not known, other direct assignment algorithms can be applied, such as repeating a fixed value or as a random value in a specified range. The VMD may optionally comprise an encoded copy of a physical or logical block address, for example. In the following, the invention is disclosed as applicable to an exemplary embodiment that utilizes a sequence number to implement a VMD. It should be noted, however, that this application is by way of example and shall not be construed as limiting the scope of the invention to the particular exemplary embodiment disclosed.

In accordance with one embodiment, the value of VMD is small (e.g., 1 to 2 bytes); and further, the value of VMD is preferably independent of the size of the AMD. The size of the VMD may be determined by a number of factors. For example, the size of VMD may be limited by the amount of storage overhead that is dedicated to storing the copy or copies of the VMD in a secondary storage location (e.g., LLNVS devices 190).

For example, if the system can hold 256 physical disk drives of size 300 GB each, and if the chunk size is X=16, then approximately 9.4 billion different VMD values are possible. Thus, in one embodiment, the VMD unit size may be selected so that a large volume of copies (and redundant copies thereof, if necessary) can fit in the available storage in a cost effective manner. Considering the above scenario, if each VMD is 2 bytes in size, for example, (i.e., a relatively large value for a VMD) then two 10 GB LLNVS devices 190 may be used to store the VMD for the entire storage system 110 in a redundant form.

In one embodiment, a LLNVS device 190 is utilized to store the related metadata for fast storage and access. The LLNVS device 190 may comprise a solid state disk (SSD), for example. The SSD preferably has the same form factor and interface as a disk drive 180, and may easily interface with array controller 120 without significantly changing the circuit design layout for the components of the storage system 110.

Furthermore, said interface may provide a natural mechanism for shared protocol access by coordinating one or more array controllers 120. In accordance with some embodiments, one or more LLNVS devices 190 may be utilized to provide a certain level of fault tolerance for storage system 110. For example, each LLNVS device 190 may be used to store a single copy of the VMD. In such exemplary implementation, the storage requirements are minimized and cost effective.

Referring to FIG. 2, one embodiment is illustrated in which one or more sectors of disk drives 180 are represented as a plurality of logical units, hereafter referred to as chunks (e.g., chunks C0 through C7). Each chunk may be associated with another logical unit, hereafter referred to as an appendix representing one sector or a portion of one sector in disk drives 180. As discussed earlier, each appendix may comprise two types of metadata, a VMD and an AMD, for example.

As illustrated, chunk C0 may be associated with an appendix comprising a VMD0 and an AMC0, for example. In one embodiment, VMD0 is stored on disk drives 180 in association with C0 and also on at least one LLNVS device 190. More than one LLNVS device 190 may be utilized to provide additional redundancy in the storage system 110. An LLNVS device 190 is preferably coupled to storage system 110 in a manner that is independent of disk drives 180. That is, metadata manager 130 and error handler 160 may access information stored on LLNVS devices 190 regardless of whether disk drives 180 are accessible.

In the above example, AMD0 is the atomicity metadata for data stored in chunk C0, and VMC0 is the validity metadata for data stored in chunk C0. AMD0 provides an association between chunk C0 and VMD0, so that error handler 160 based on the atomicity metadata AMD0 can determine whether or not data in chunk C0 and validity metadata VMD0 were written in a single write operation, for example. As shown, VMD1 through VMD7 respectively associated with chunks C1 through C7 may be also stored in LLNVS0 and LLNVS1, for example.

VMD0 provides information about the data in data chunk C0 as VMD0 is copied to the LLNVS devices 190. For example, each time C0 is written, VMD0 changes (e.g., by way of time-stamping or incrementing a version number associated with the data). VMD0 may change even if the data in data chunk C0 remains the same (e.g., if the data is written twice by host 100). If the version number is unlimited in size, then incrementing it each time it is written provides information on how many times it was written, assuming there are no errors. For example, VMD0 may provide information indicating that a data chunk is version 27 of C0 (i.e., indicating that C0 has changed 27 times). For a timestamp, VMD0 may provide information indicating that a data chunk is the version that was written at time 12:07:12 on date Jul. 31, 2007, for example. It is noteworthy that in the exemplary embodiment illustrated in FIG. 2, AMD0 is not copied to LLNSV0 or LLNSV1. Instead, AMD0 is stored on disk drives 180 in association with C0 such that data in both AMD0 and C0 may be read in a single read operation, as provided in more detail below.

Referring to FIG. 3, an exemplary embodiment is illustrated as applicable to a RAID system architecture (e.g., in the context of RAID4 or RAID5 stripe). In this exemplary embodiment, two chunks per strip are illustrated. This exemplary embodiment should not be however construed as limiting the scope of the invention to the particular number of chunks per stripe disclosed. Depending on implementation fewer or more chunks per stripe may be configured.

As shown, the chunks and metadata from one row constitute a substripe of the RAID stripe, for example. In the exemplary embodiment with the two chunks per strip, the logical host addressing correlates to C0, C4, C1, C5, etc. Depending on implementation, one or more embodiments may be configured to apply to any RAID architecture such as RAID1, RAID3, and any type of RAID6 or higher fault tolerant code, including Reed-Solomon based codes, for example.

Figure 4:
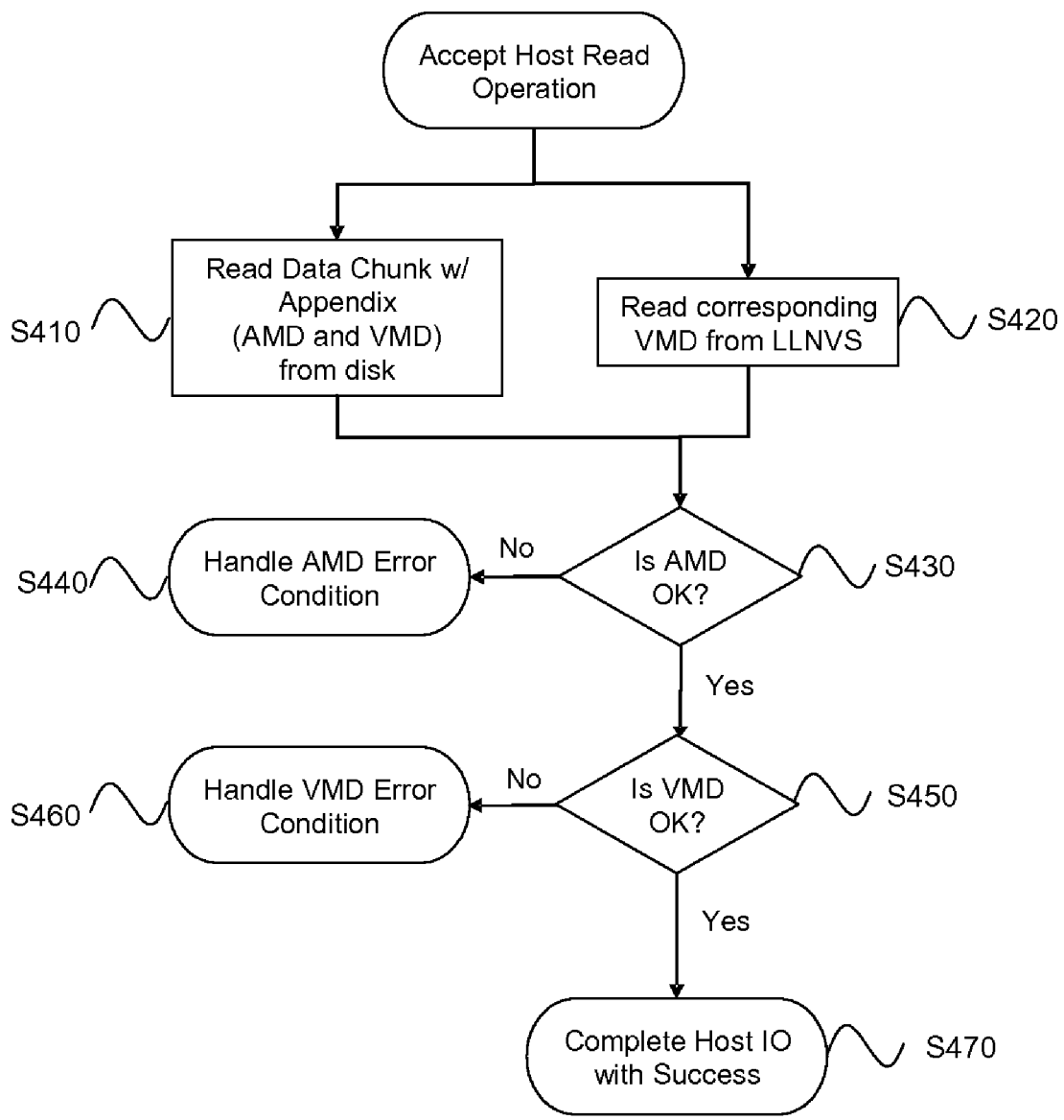
FIGS. 4 through 6 illustrate flow charts of data validation methods according to one or more embodiments.
Figure 5:
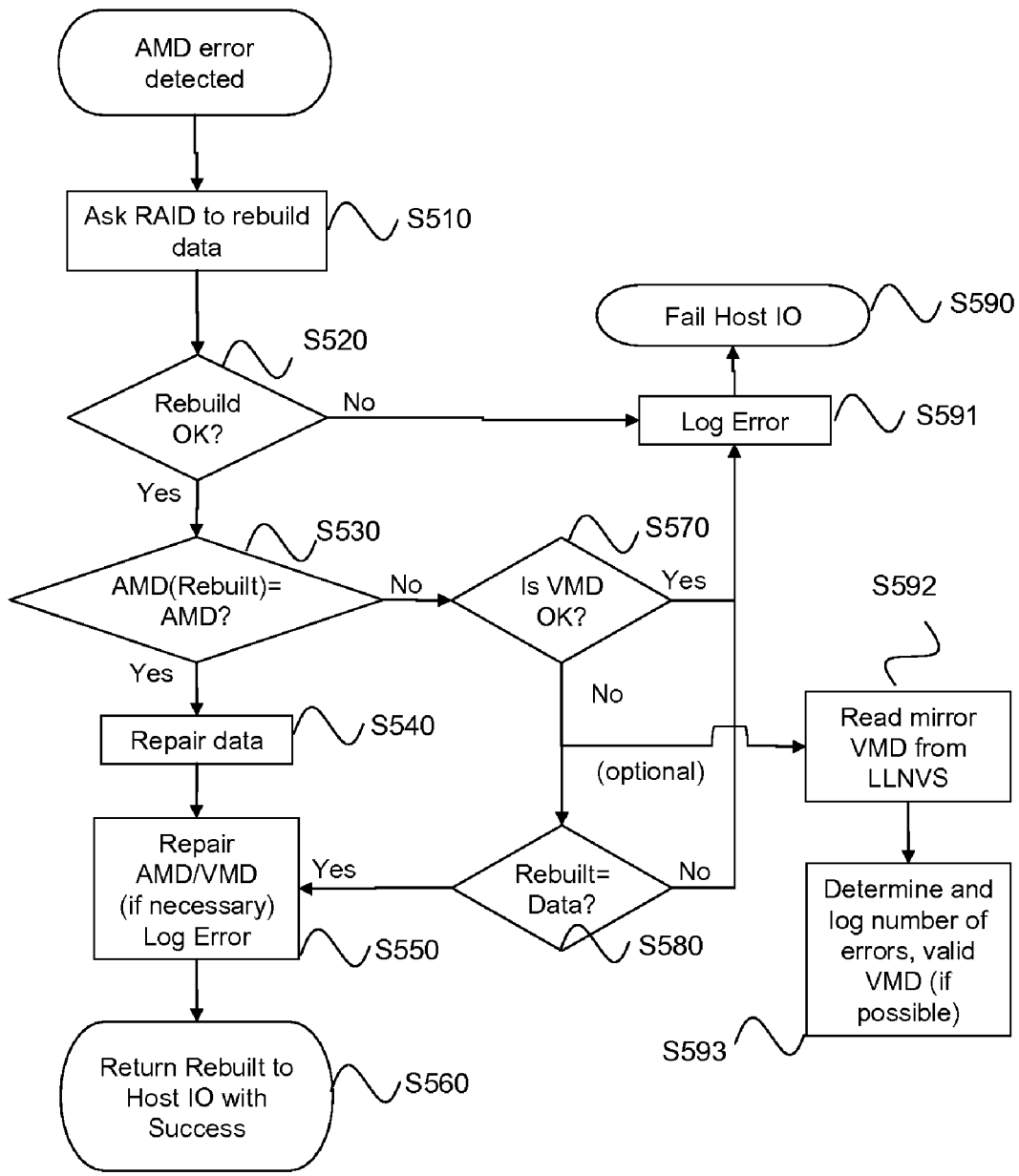
Figure 6:
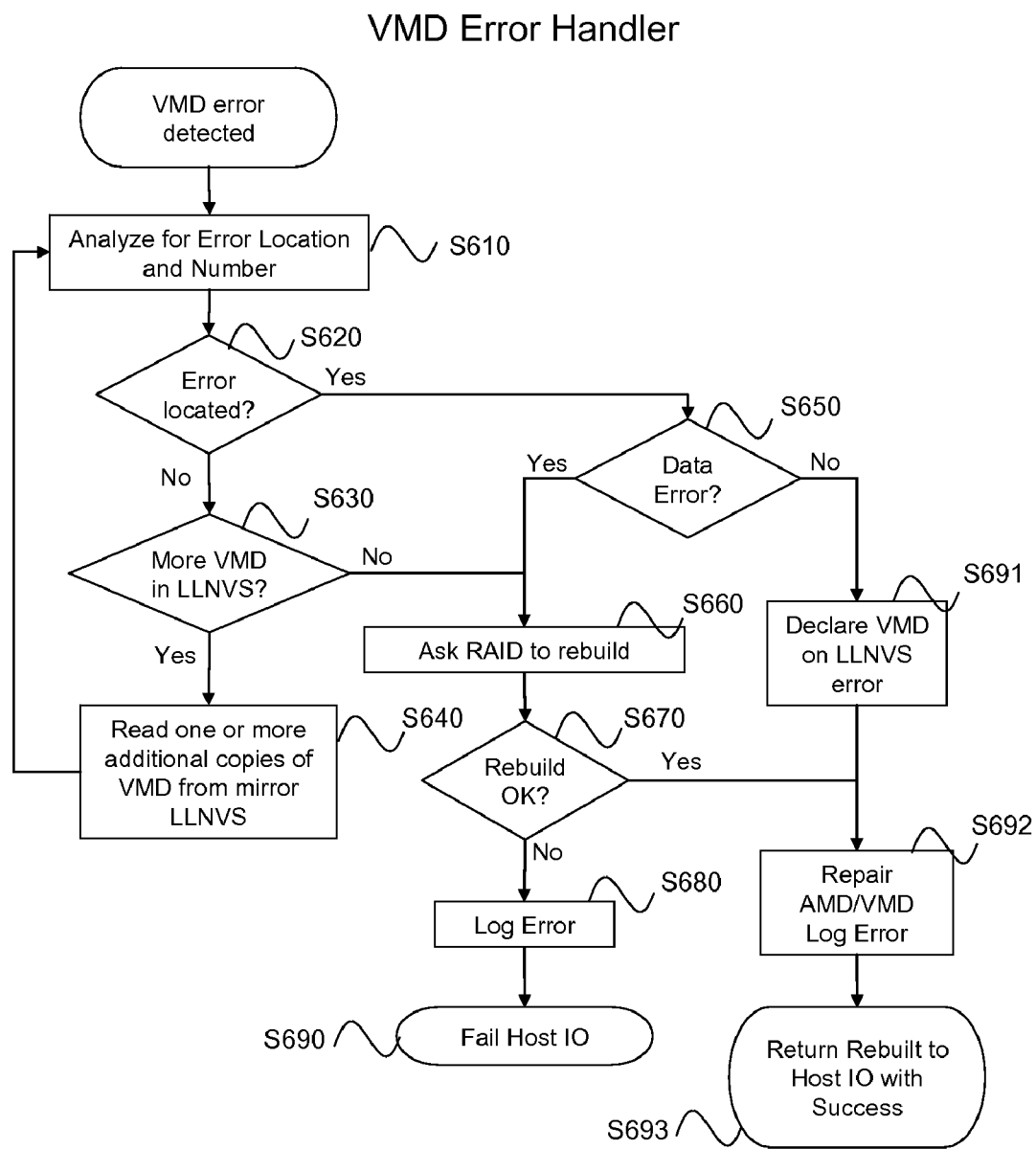

Referring to FIGS. 4 through 6, exemplary methods for data validation and error handling in accordance with one or more embodiments are provided. In the following methods, multiple copies of VMDs as stored in one or more LLNVS devices 190 are utilized in application to a RAID layer to assist with locating and correcting input output (IO) errors associated with a host request for an IO operation.

Certain aspects and advantages of the invention are disclosed as applicable to an exemplary algorithm applied in the context of an exemplary host operation (e.g., a read operation). It is noteworthy, however, that the principals and advantages disclosed can be equally applied to other operations in accordance with other embodiments.

Referring to FIGS. 1 and 4, an exemplary method for performing a host read operation, in accordance with one embodiment is provided. Host 100 may, for example, read a data chunk and an associated appendix from disk drives 180 (S410), and also at least one copy of a VMD corresponding to data chunk from one of the LLNVS devices 190 (S420).

In one embodiment, checker 134 examines the AMD to validate the integrity of read data (S430). If the AMD for the data read is inconsistent with the data, then checker 134 may determine that the data or the appendix has been corrupted; and checker 134 may invoke error handler 160 (e.g., see exemplary AMD error handler module in FIG. 5) to mange the error (S440).

Otherwise, if the AMD associated with the read data is consistent with the data, then checker 134 may verify the integrity of the VMD for the read data (S450). If the VMD passes the integrity check (e.g., if the copy of VMD included in the data appendix is consistent with the copy of VMD stored in the LLNVS devices 190), then checker 134 assumes the data is valid and host 100 completes the requested IO operation (e.g., the read operation) with success (S470).

In one embodiment, if the two copies of the VMD stored in the appendix and in the LLNVS devices 190 respectively are inconsistent, then checker 134 may invoke error handler 160 (e.g., see exemplary VMD error handler method in FIG. 6) to manage the error (S460). As shown in FIGS. 5 and 6, the two error handler methods for VMD and AMD may use multiple copies of VMD as stored in one or more LLNVS devices 190 as integrated with a RAID layer to repair corrupt data stored on disk drives 180.

Referring to FIGS. 1 and 5, when an AMD error is detected (e.g., when checker 134 has determined that the AMD for the read data is corrupted without examining the VMD), then it is possible that either the data or the appendix or both are corrupted.

In the above scenario, regardless of whether the two copies of the VMD (i.e., the one stored in the appendix and the other stored in the LLNVS device 190) are consistent or not, the read data may need to be independently validated. Consequently, in one embodiment, checker 134 may invoke the RAID layer to rebuild the data (S510).

Error handler 160 determines whether the RAID layer can successfully repair or validate the data (S520). If not, then logger 165 logs the error (S591) and fails the host IO operation (S590). If the RAID layer rebuild succeeds, then two copies of the data are available: one read directly from disk drives 180 and the other produced as the result of the rebuild operation.

In one embodiment, checker 134 determines whether the AMD associated with the rebuilt data is consistent with the AMD associated with the data in the appendix (S530). If so, then the rebuilt data is correct and the data read from disk drives 180 is corrupted; and thus the data on disk drive 180 is repaired by error handler 160 (S540).

In some embodiments, error handler 160 may also repair or regenerate the metadata (e.g., AMD or VMD) associated with the data and logger 165 may log the error conditions (S550). Accordingly, once the error conditions are determined and the corrupted data is rebuilt, the rebuilt data is submitted to host 100 and the IO operation is successfully completed (S560).

Referring back to block S530, if checker 134 determines that the AMD associated with the rebuilt data is inconsistent with that from the appendix, then checker 134 determines if the VMD in the appendix is consistent with the VMD stored in LLNVS devices 190 (S570). If so, then the VMD in the appendix is correct, but since the AMD for the rebuilt data is not a match, logger 165 may log an error (S591) and fail the IO operation requested by host 100 (S590).

If checker 134 determines that the VMD in the appendix is inconsistent with the VMD stored in one LLNVS device 190, checker 134 may optionally attempt to read a mirror VMD from another LLNVS device 190 (S592). This process may continue when there are multiple copies of the VMD stored in multiple LLNVS devices 190 until a conclusive result regarding validity of the VMD is reached.

In the above scenario, it is possible that the VMD in the appendix is corrupted, leaving to the presumption that the data read from disk may be still valid. In one embodiment, to verify whether the data is valid, checker 134 examines the rebuilt data to determine if it is consistent with data read from disk drives 180 (S580). If the two are consistent, then the process continues to repair the metadata as discussed in blocks S550 and S560; otherwise, logger 165 may log an error as discussed earlier with reference to blocks S590 and S591.

A VMD error may be detected when the AMD associated with data stored in disk drives 180 matches the AMD from the appendix but the VMD stored in the appendix is consistent with the VMD stored in one of LLNVS devices 190.

In an exemplary embodiment, sequence numbers associated with the data stored on disk drives 180 are used to implement the VMD for the data. In such embodiment, it is possible to examine an older version of the VMD for the data to determine which of the two values is correct.

Referring to FIGS. 1 and 6, a VMD error handling method in accordance with one embodiment is provided. As shown, when a VMD error is detected, for example, based on sequence numbers associated with the target data, the VMD for the target data may be analyzed to determine error in location and number (S610). For example, the VMDs may record sequence numbers that are incremented with each write. If the VMD with the data is one less than the VMD stored in LLNVS devices 190, then most likely the data is stale (i.e., its VMD didn't get incremented the same way that the VMD in LLNVS device 190 was incremented). For small fixed size sequence numbers (e.g., 1 byte), a wrap around may be implemented when the sequence number reaches its largest value. In one embodiment, there may be additional copies of the VMD in other LLNVS devices 190 for the purpose of redundancy. A voting procedure may be employed in this context, to determine if the redundant copies are consistent. If some are and some aren't, then the one that is inconsistent may be used to determine the location of error.

Error handler 160, in one embodiment, is configured to locate the error (S620). If an error is located, then error handler 160 may determine whether the error is associated with the target data (S650). If so, error handler 160 may request that the RAID layer to rebuild the target data (S660). If the rebuild process for the target data is successful (S670), the corresponding metadata (e.g., AMD/VMD) for the target data is also repaired and logger 165 may log an error (S692). Depending on implementation, the rebuilt data can be provided to host 100 to successfully complete the IO request (S693).

Referring back to block S670, if the rebuild attempt is not successful, then logger 165 logs an error (S680) and an IO failure is returned to host 100 in response to the submitted IO request.

Referring back to block S650, if error handler 160 does not locate an error in the target data based on the detected VMD error, then it is determined that the VMD stored in LLNVS device 190 is corrupted, and an error is declared accordingly (S691). In such scenario, the VMD is repaired, and logger 165 logs the errors (S692) and the host IO request is successfully completed (S693), preferably without RAID recovery.

Referring back to block S620, if error handler 160 does not locate an error, then VMDs in one or more LLNVS devices 190 are examined (S630) to read one or more additional copies of the VMD from LLNVS devices 190 that may have stored mirror copies of the VMD (S640). If additional copies of the VMD are retrieved, then error handler 160 may return to block S610 to analyze errors as illustrated in FIG. 6 and as discussed in detail above.

In different embodiments, the invention can be implemented either entirely in the form of hardware or entirely in the form of software, or a combination of both hardware and software elements. For example, the error handlers may comprise a controlled computing system environment that can be presented largely in terms of hardware components and software code executed to perform processes that achieve the results contemplated by the system of the present invention.

Figure 7:
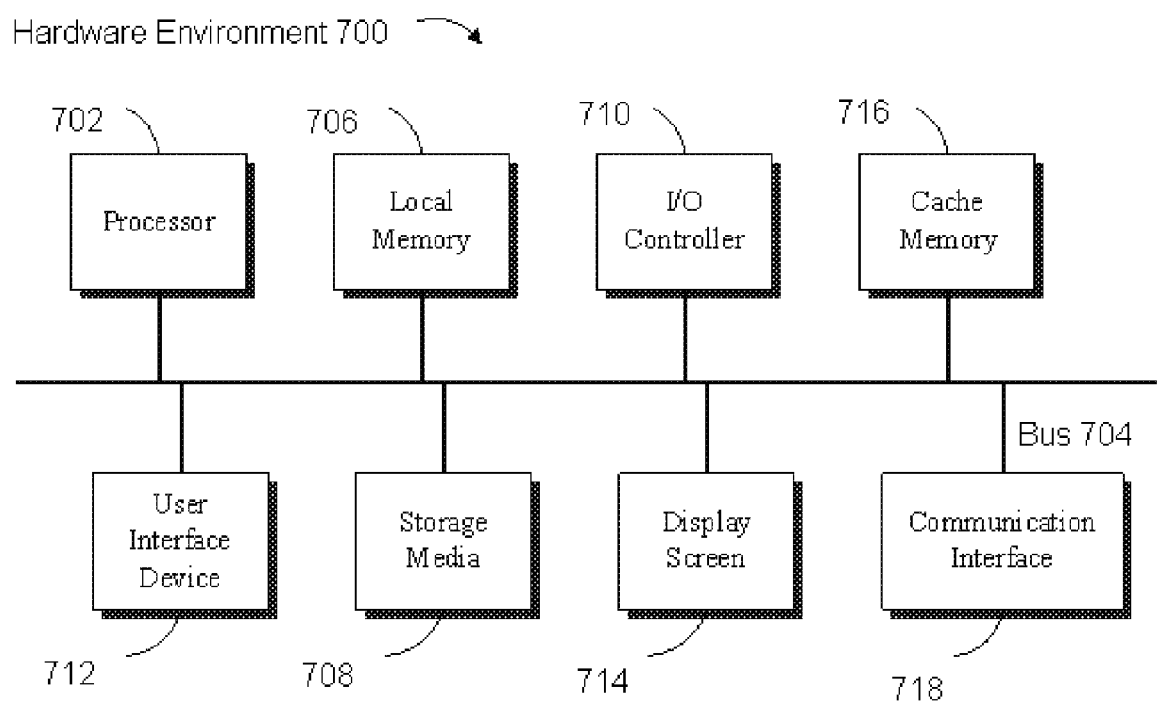
FIGS. 7 and 8 are block diagrams of hardware and software environments in which the system of the present invention may operate, in accordance with one or more embodiments.
Figure 8:
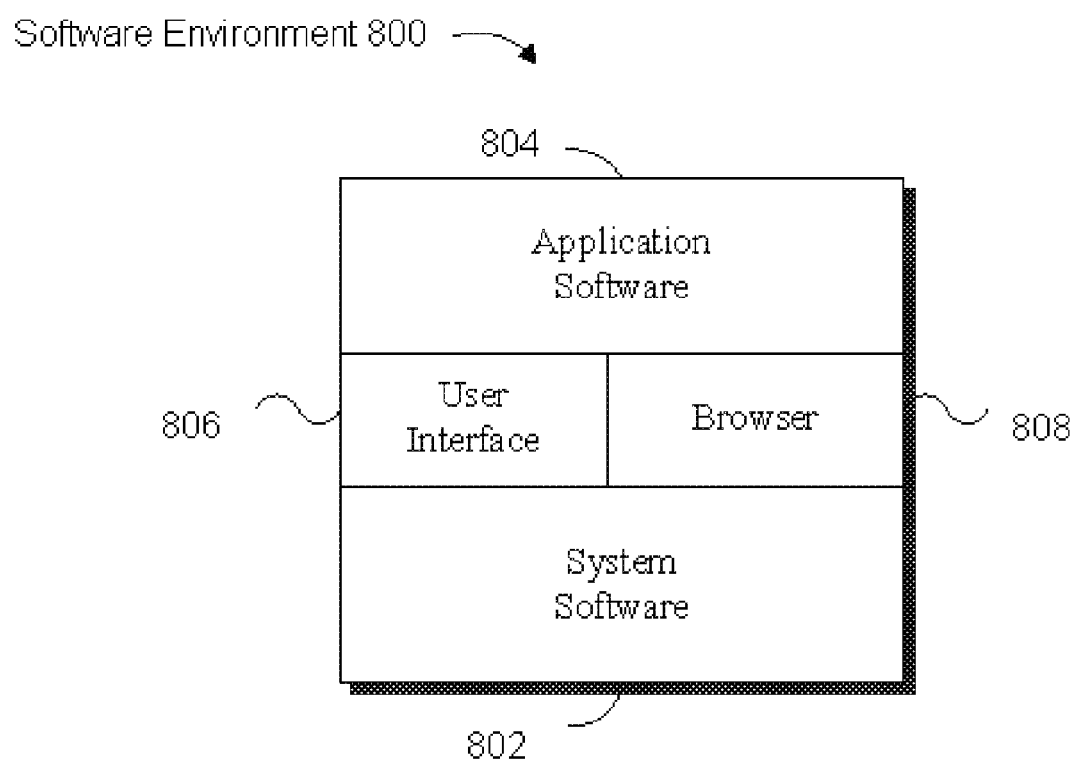

Referring to FIGS. 7 and 8, a computing system environment in accordance with an exemplary embodiment is composed of a hardware environment 700 and a software environment 800. The hardware environment 700 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 800 is divided into two major classes comprising system software 802 and application software 804. System software 802 comprises control programs, such as the operating system (OS) and information management systems that instruct the hardware how to function and process information.

In one embodiment, the data validation and error handling processes noted above can be implemented as application software 804 executed on one or more hardware environments to facilitate error detection and data recovery in storage system 110. Application software 804 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 7, an embodiment of the application software 804 can be implemented as computer software in the form of computer readable code executed on a data processing system such as hardware environment 700 that comprises a processor 702 coupled to one or more memory elements by way of a system bus 704. The memory elements, for example, can comprise local memory 706, storage media 708, and cache memory 716. Processor 702 loads executable code from storage media 708 to local memory 706. Cache memory 716 provides temporary storage to reduce the number of times code is loaded from storage media 708 for execution.

A user interface device 712 (e.g., keyboard, pointing device, etc.) and a display screen 714 can be coupled to the computing system either directly or through an intervening I/O controller 710, for example. A communication interface unit 718, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 700 may not include all the above components, or may comprise other components for additional functionality or utility. For example, hardware environment 700 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 8, application software 804 can comprise one or more computer programs that are executed on top of system software 802 after being loaded from storage media 708 into local memory 706. In a client-server architecture, application software 804 may comprise client software and server software. For example, in one embodiment of the invention, client software may be executed on host 100 and server software is executed on storage system 110.

Software environment 800 may also comprise browser software 808 for accessing data available over local or remote computing networks. Further, software environment 800 may comprise a user interface 806 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A data storage method comprising:
    storing first data in at least a first data chunk in response to a write request to store the first data on a first disk drive, wherein the first data chunk is a logical representation of one or more sectors on at least the first disk drive in a storage system;
    storing first metadata, associated with the first data, in at least a first appendix in response to the same write request, wherein the first appendix is a logical representation of a sector region on at least the first disk drive in the storage system, and wherein the first metadata comprises first atomicity metadata (AMD) and first validity metadata (VMD) associated with the first data; and
    storing one or more copies of the first VMD for the first data in one or more low latency non-volatile storage (LLNVS) devices in response to the same write request, so that when an error associated with content in the first chunk or the first appendix is detected during a read request for the first data, the copy of first VMD stored in the LLNVS device can be accessed with a low level of latency for the purpose of comparison with the first VMD stored in the first appendix to determine whether the data written during the write request is the same as the data read during the read request,
    wherein said storing of the first data, the first metadata and the one or more copies of the first VMD is performed prior to retrieval of the first metadata from the first appendix, wherein the retrieval is performed subsequent to said write request.

2. The data storage method of claim 1, wherein the first VMD provides information about the first data that can be used to determine whether the first data is corrupted.

3. The data storage method of claim 1, wherein the first AMD provides information on when the first data and the corresponding first VMD stored in the first appendix are both successfully written during an update phase.

4. The data storage method of claim 1 further comprising analyzing the first VMD stored in the appendix to determine whether the first data is corrupted, in response to determining an error associated with the first VMD.

5. The data storage method of claim 4 further comprising:
    comparing the first VMD stored in the appendix with a copy of the first VMD stored in the LLNVS to determine whether the first VMD in the appendix is corrupted.

6. The data storage method of claim 5 further comprising rebuilding the first data in response to determining that the first VMD in the appendix is not corrupted.

7. The data storage method of claim 5 further comprising rebuilding the first VMD in response to determining that the first VMD in the appendix is corrupted.

8. The data storage method of claim 1 further comprising examining the first AMD to determine validity of the first VMD, in response to receiving a request from a host system to perform an operation on the first data.

9. The data storage method of claim 8 further comprising:
    rebuilding the first data to produce second data, in response to determining that the first AMD is corrupted;
    determining a second AMD associated with the second data;
    comparing the first AMD with the second AMD to determine whether first AMD and the second AMD are consistent; and
    replacing the first data stored in the first chunk with the second data, in response to determining that the first AMD is consistent with the second AMD.

10. The data storage method of claim 9 further comprising repairing the first AMD or the first VMD in response to determining that the first AMD and the second AMD are inconsistent.

11. A data storage system comprising:
    at least a first disk drive for storing first data in at least a first data chunk in response to a write request to store the first data on the first disk drive, wherein the first data chunk is a logical representation of one or more sectors on at least the first disk drive in a storage system;
    a first appendix for storing first metadata, associated with the first data, in response to the same write request, wherein the first appendix is a logical representation of a sector region on at least the first disk drive in the storage system, and wherein the first metadata comprises first atomicity metadata (AMD) and first validity metadata (VMD) associated with the first data; and
    at least one low latency non-volatile storage (LLNVS) devices for storing a copy of the first VMD for the first data in response to the same write request, so that when an error associated with content in the first chunk or the first appendix is detected during a read request for the first data, the copy of first VMD stored in the LLNVS device can be accessed with a low level of latency for the purpose of comparison with the first VMD stored in the first appendix to determine whether the data written during the write request is the same as the data read during the read request,
    wherein said storing of the first data, the first metadata and the one or more copies of the first VMD is performed prior to retrieval of the first metadata from the first appendix, wherein the retrieval is performed subsequent to said write request.

12. The data storage system of claim 11, wherein the first VMD provides information about the first data that can be used to determine whether the first data is corrupted.

13. The data storage system of claim 11, wherein the first AMD provides information on when the first data and the corresponding first VMD stored in the first appendix are both successfully written during an update phase.

14. The data storage system of claim 11 further wherein the first VMD stored in the appendix is analyzed to determine whether the first data is corrupted, in response to determining an error associated with the first VMD.

15. The data storage system of claim 14 wherein the first VMD stored in the appendix is compared with a copy of the first VMD stored in the LLNVS to determine whether the first VMD in the appendix is corrupted.

16. The data storage system of claim 15 further wherein the first data is rebuilt in response to determining that the first VMD in the appendix is not corrupted.

17. The data storage system of claim 15 wherein the first VMD is rebuilt in response to determining that the first VMD in the appendix is corrupted.

18. The data storage system of claim 11 further wherein the first AMD is examined to determine validity of the first VMD, in response to receiving a request from a host system to perform an operation on the first data.

19. The data storage system of claim 18 wherein:
the first data is rebuilt to produce second data, in response to determining that the first AMD is corrupted;
a second AMD associated with the second data is determined;
the first AMD is compared with the second AMD to determine whether first AMD and the second AMD are consistent; and
the first data stored in the first chunk is replaced with the second data, in response to determining that the first AMD is consistent with the second AMD.

20. A computer program product comprising a computer readable storage medium having a computer readable program stored thereon, wherein the computer readable program when executed on a computer causes the computer to:
store first data in at least a first data chunk in response to a write request to store the first data on a first disk drive, wherein the first data chunk is a logical representation of one or more sectors on at least the first disk drive in a storage system;
store first metadata, associated with the first data, in at least a first appendix in response to the same write request, wherein the first appendix is a logical representation of a sector region on at least the first disk drive in the storage system, and wherein the first metadata comprises first atomicity metadata (AMD) and first validity metadata (VMD) associated with the first data, wherein the AMD comprises one or more of cyclic redundancy check (CRC) metadata or longitudinal redundancy check (CRC) metadata; and
store a plurality of copies of the first VMD for the first data in a plurality of low latency non-volatile storage (LLNVS) device in response to the same write request, so that when an error associated with content in the first chunk or the first appendix is detected during a read request for the first data, the copy of first VMD stored in the LLNVS device can be accessed with a low level of latency for the purpose of comparison with the first VMD stored in the first appendix to determine whether the data written during the write request is the same as the data read during the read request,
wherein said storing of the first data, the first metadata and the one or more copies of the first VMD is performed prior to retrieval of the first metadata from the first appendix, wherein the retrieval is performed subsequent to said write request.

* * * * *